United States Patent
Jian et al.

(10) Patent No.: US 10,769,146 B1
(45) Date of Patent: Sep. 8, 2020

(54) DATA LOCALITY BASED QUERY OPTIMIZATION FOR SCAN OPERATORS

(71) Applicant: EMC IP Holding Company LLC, Hopkinton, MA (US)

(72) Inventors: Lirong Jian, Beijing (CN); Lei Chang, Beijing (CN); Zhanwei Wang, Beijing (CN); Tao Ma, Beijing (CN); Luke Lonergan, San Carlos, CA (US); Lili Ma, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 240 days.

(21) Appl. No.: 13/853,827

(22) Filed: Mar. 29, 2013

Related U.S. Application Data

(60) Provisional application No. 61/769,043, filed on Feb. 25, 2013.

(51) Int. Cl.
  *G06F 7/00* (2006.01)
  *G06F 16/2453* (2019.01)

(52) U.S. Cl.
  CPC .............. *G06F 16/24542* (2019.01)

(58) Field of Classification Search
  CPC ............ G06F 17/30477; G06F 16/2453
  USPC .................................. 707/718, 713
  See application file for complete search history.

(56) References Cited

U.S. PATENT DOCUMENTS

| | | | |
|---|---|---|---|
| 5,933,422 A * | 8/1999 | Kusano | H04Q 11/0478 340/2.9 |
| 6,957,222 B1 | 10/2005 | Ramesh | |
| 7,599,969 B2 | 10/2009 | Mignet et al. | |
| 7,653,665 B1 | 1/2010 | Stefani et al. | |
| 7,702,676 B2 * | 4/2010 | Brown | G06F 16/90335 707/713 |
| 7,743,051 B1 * | 6/2010 | Kashyap | G06F 16/2471 707/713 |
| 7,885,953 B2 * | 2/2011 | Chen | G06F 16/2456 707/713 |

(Continued)

FOREIGN PATENT DOCUMENTS

| | | |
|---|---|---|
| CN | 102033889 A | 8/2012 |
| WO | 2012050582 A1 | 4/2012 |
| WO | WO-2012124178 A1 | 9/2012 |

OTHER PUBLICATIONS

Brad Hedlund, "Understanding Hadoop Clusters and the Network," Bradhedlund.com, 2011, pp. 1-22. Available at http://bradhedlund.com/2011/09/10/understanding-hadoop-clusters-and-the-network/.*

(Continued)

*Primary Examiner* — Alexandria Y Bromell
(74) *Attorney, Agent, or Firm* — Van Pelt, Yi & James LLP

(57) ABSTRACT

Data location-based query optimization for scan operators in a large-scale distributed database system is disclosed. In various embodiments, a set of query processing segments to be used to process a query is identified. It is determined for each of a plurality of data blocks to be scanned to process the query a corresponding storage location in which the data block is stored in a distributed storage system. Each of the plurality of data blocks is assigned to be scanned by a query processing segment selected based at least in part on a location of the query processing segment relative to the corresponding storage location in which the data block is stored.

24 Claims, 7 Drawing Sheets

(56) References Cited

U.S. PATENT DOCUMENTS

| | | | |
|---|---|---|---|
| 7,906,259 B2* | 3/2011 | Hayashi | G03F 1/24 |
| | | | 430/5 |
| 7,908,242 B1 | 3/2011 | Achanta | |
| 7,921,130 B2 | 4/2011 | Hinshaw et al. | |
| 7,984,043 B1 | 7/2011 | Waas | |
| 8,171,018 B2 | 5/2012 | Zane | |
| 8,266,122 B1 | 9/2012 | Newcombe et al. | |
| 8,359,305 B1 | 1/2013 | Burke et al. | |
| 8,572,051 B1 | 10/2013 | Chen et al. | |
| 8,645,356 B2* | 2/2014 | Bossman | G06F 16/2455 |
| | | | 707/718 |
| 8,713,038 B2 | 4/2014 | Cohen et al. | |
| 8,805,870 B2 | 8/2014 | Chen et al. | |
| 8,868,546 B2 | 10/2014 | Beerbower et al. | |
| 8,935,232 B2* | 1/2015 | Abadi | G06F 16/24547 |
| | | | 707/714 |
| 8,990,335 B2* | 3/2015 | Fauser | G06F 16/183 |
| | | | 709/215 |
| 9,110,706 B2 | 8/2015 | Yu | |
| 9,235,396 B2 | 1/2016 | Ke | |
| 9,626,411 B1 | 4/2017 | Chang | |
| 9,639,575 B2 | 5/2017 | Leida | |
| 2003/0037048 A1 | 2/2003 | Kabra | |
| 2003/0212668 A1 | 11/2003 | Hinshaw et al. | |
| 2004/0030739 A1 | 2/2004 | Yousefi'zadeh | |
| 2004/0073549 A1* | 4/2004 | Turkel | G06F 16/2454 |
| | | | 707/707 |
| 2004/0095526 A1* | 5/2004 | Yamabuchi | G02F 1/133351 |
| | | | 349/96 |
| 2004/0186842 A1 | 9/2004 | Newcombe et al. | |
| 2005/0289098 A1 | 12/2005 | Barsness et al. | |
| 2006/0224563 A1 | 10/2006 | Hanson | |
| 2007/0050328 A1* | 3/2007 | Li | G06F 16/9032 |
| | | | 707/707 |
| 2008/0059489 A1 | 3/2008 | Han et al. | |
| 2008/0082644 A1 | 4/2008 | Isard | |
| 2008/0086442 A1 | 4/2008 | Dasdan | |
| 2008/0120314 A1 | 5/2008 | Yang | |
| 2008/0195577 A1 | 8/2008 | Fan et al. | |
| 2008/0222090 A1* | 9/2008 | Sasaki | G06F 16/21 |
| | | | 707/707 |
| 2008/0244585 A1 | 10/2008 | Candea et al. | |
| 2009/0043745 A1 | 2/2009 | Barness et al. | |
| 2009/0182792 A1 | 7/2009 | Bomma et al. | |
| 2009/0216709 A1* | 8/2009 | Cheng | G06F 16/2453 |
| | | | 707/707 |
| 2009/0234850 A1 | 9/2009 | Kocsis et al. | |
| 2009/0254916 A1 | 10/2009 | Bose et al. | |
| 2009/0271385 A1 | 10/2009 | Krishnamoorthy et al. | |
| 2009/0292668 A1 | 11/2009 | Xu | |
| 2010/0088298 A1 | 4/2010 | Xu | |
| 2010/0114970 A1 | 5/2010 | Marin | |
| 2010/0198806 A1* | 8/2010 | Graefe | G06F 16/24542 |
| | | | 707/713 |
| 2010/0198807 A1* | 8/2010 | Kuno | G06F 16/24542 |
| | | | 707/713 |
| 2010/0198808 A1* | 8/2010 | Graefe | G06F 16/24549 |
| | | | 707/713 |
| 2010/0198809 A1* | 8/2010 | Graefe | G06F 16/24549 |
| | | | 707/713 |
| 2010/0223305 A1 | 9/2010 | Park et al. | |
| 2010/0241827 A1 | 9/2010 | Yu et al. | |
| 2010/0241828 A1 | 9/2010 | Yu | |
| 2010/0257198 A1* | 10/2010 | Cohen | G06F 16/24542 |
| | | | 707/770 |
| 2010/0332458 A1* | 12/2010 | Xu | G06F 16/2456 |
| | | | 707/673 |
| 2011/0047172 A1 | 2/2011 | Chen et al. | |
| 2011/0131198 A1 | 6/2011 | Johnson et al. | |
| 2011/0138123 A1* | 6/2011 | Gurajada | G06F 16/284 |
| | | | 711/118 |
| 2011/0228668 A1 | 9/2011 | Pillai et al. | |
| 2011/0231389 A1 | 9/2011 | Surna et al. | |
| 2011/0246511 A1 | 10/2011 | Smith et al. | |
| 2011/0302164 A1 | 12/2011 | Krishnamurthy et al. | |
| 2012/0036146 A1 | 2/2012 | Annapragada | |
| 2012/0078973 A1 | 3/2012 | Gerdes | |
| 2012/0191699 A1 | 7/2012 | George et al. | |
| 2012/0259894 A1 | 10/2012 | Varley et al. | |
| 2013/0030692 A1* | 1/2013 | Hagan | G06F 16/29 |
| | | | 701/410 |
| 2013/0031139 A1 | 1/2013 | Chen | |
| 2013/0054630 A1* | 2/2013 | Briggs | G06F 16/2452 |
| | | | 707/760 |
| 2013/0117237 A1 | 5/2013 | Thomsen et al. | |
| 2013/0138612 A1 | 5/2013 | Iyer | |
| 2013/0166523 A1 | 6/2013 | Pathak et al. | |
| 2013/0173716 A1* | 7/2013 | Rogers | H04L 67/32 |
| | | | 709/206 |
| 2013/0346988 A1 | 12/2013 | Bruno | |
| 2014/0019683 A1 | 1/2014 | Ishikawa | |
| 2014/0067792 A1 | 3/2014 | Erdogan et al. | |
| 2014/0095526 A1* | 4/2014 | Harada | G06F 7/582 |
| | | | 707/764 |
| 2014/0108459 A1* | 4/2014 | Gaza | G06F 16/278 |
| | | | 707/792 |
| 2014/0108861 A1 | 4/2014 | Abadi et al. | |
| 2014/0122542 A1 | 5/2014 | Barnes et al. | |
| 2014/0136590 A1 | 5/2014 | Marty et al. | |
| 2014/0149355 A1 | 5/2014 | Gupta | |
| 2014/0149357 A1* | 5/2014 | Gupta | G06F 16/2308 |
| | | | 707/652 |
| 2014/0188841 A1 | 7/2014 | Sun et al. | |
| 2014/0188884 A1 | 7/2014 | Morris | |
| 2014/0195558 A1 | 7/2014 | Murthy et al. | |
| 2014/0201565 A1 | 7/2014 | Candea et al. | |

OTHER PUBLICATIONS

Brad Hedlund "Understanding Hadoop Clusters and the Network," 2011 (http://bradhedlund.com/2011/09/10/understanding-hadoop-clusters-and-the-network/).*

Brad Helund, "Understanding Hadoop CLusters and the Netwoork," 2011.*

* cited by examiner

DATA LOCALITY BASED QUERY OPTIMIZATION FOR SCAN OPERATORS

CROSS REFERENCE TO OTHER APPLICATIONS

This application claims priority to U.S. Provisional Patent Application No. 61/769,043 entitled INTEGRATION OF MASSIVELY PARALLEL PROCESSING WITH A DATA INTENSIVE SOFTWARE FRAMEWORK filed Feb. 25, 2013 which is incorporated herein by reference for all purposes.

BACKGROUND OF THE INVENTION

Distributed storage systems enable databases, files, and other objects to be stored in a manner that distributes data across large clusters of commodity hardware. For example, Hadoop® is an open-source software framework to distribute data and associated computing (e.g., execution of application tasks) across large clusters of commodity hardware.

A database table or other large object may be stored in a distributed storage system as a set of files, each file comprising a portion of the object. In the Hadoop® distributed file system, for example, a file may be stored as a set of blocks. Typically, three copies of a block are stored, one on the host at which the data was written to the file, a second on another host on the same rack, and a third on a host in another rack. A storage master node stores metadata indicating the location of each of the copies.

To perform a "scan" operation required to be performed to respond to a query, for example to find records that match criteria specified in the query, data associated with rows of one or more database tables may have to be read, parsed, and analyzed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Optimizing the scan operators of a query for a large-scale parallel analytic database system atop a distributed storage system is disclosed. In various embodiments, data location information is leveraged to accelerate scan operations, for example by assigning a task to scan a block of data to a processing segment on or near a host on which the block of data is stored.

Figure 1:
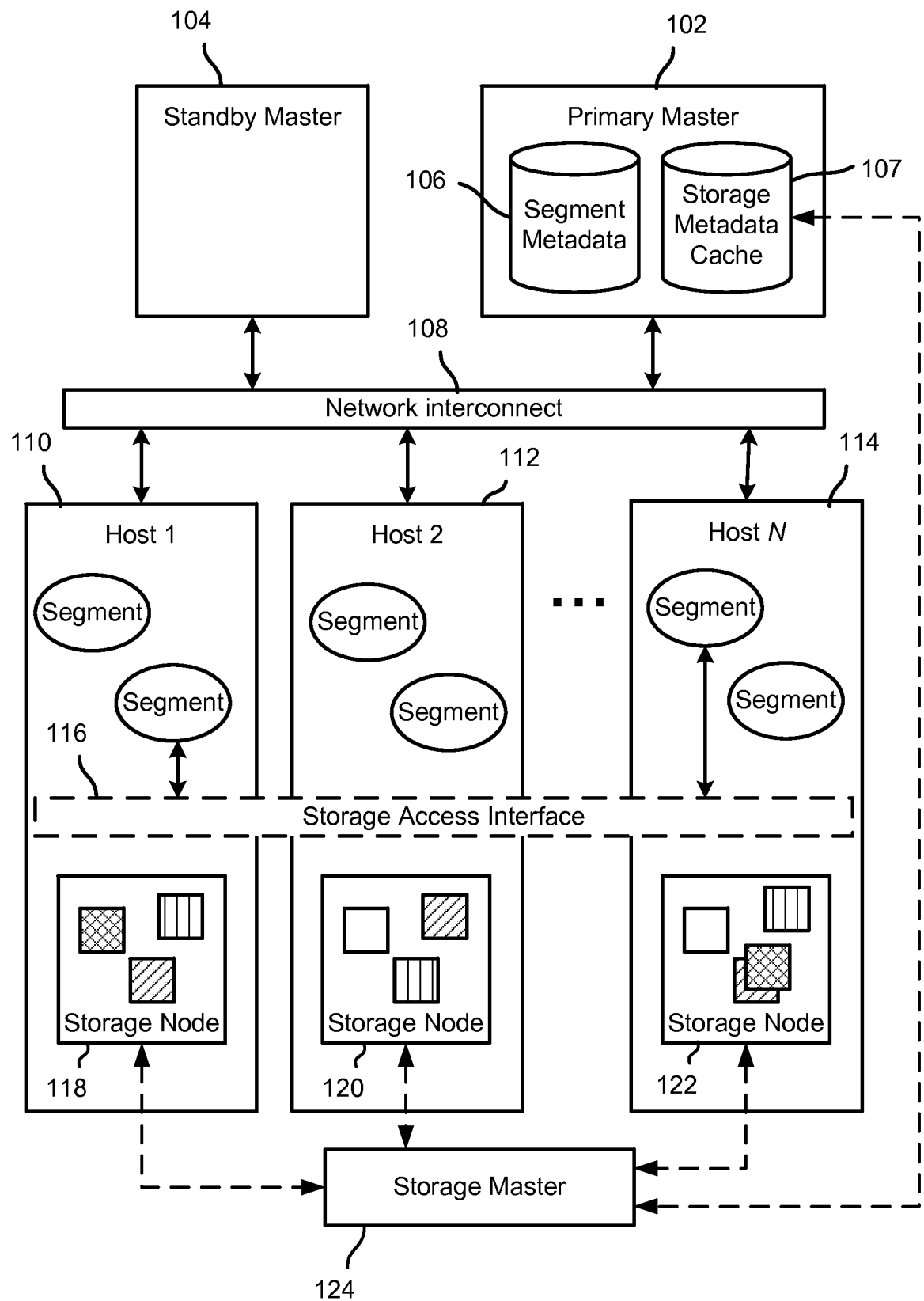
FIG. 1 is a block diagram illustrating an embodiment of a large scale distributed system.

FIG. 1 is a block diagram illustrating an embodiment of a large scale distributed system. In the example shown, the large scale distributed system includes a large cluster of commodity servers. The master hosts include a primary master 102 and a standby master 104. The primary master 102 is responsible for accepting queries; planning queries, e.g., based at least in part on database system metadata 106, which in various embodiments includes information indicating where processing segments are located within the system; dispatching queries to segments for execution; and collecting the results from segments. The primary master 102 includes a storage metadata cache 107 used to cache metadata indicating where within a distributed storage system portion of the large-scale distributed system each of at least a subset of blocks are stored. The standby master 104 is a warm backup of the primary master 102. The network interconnect 108 is used to communicate tuples between execution processes. The compute unit of the database engine is called a "segment". Each of a large number of hosts 1 to N, represented in FIG. 1 by hosts 110, 112, and 114, can have multiple segments. The segments on segment hosts 110, 112, 114, for example, are configured to execute tasks assigned by the primary master 102, such as to perform assigned portions of a query plan with respect to data stored in a distributed storage layer, e.g., a Hadoop® or other storage layer, accessed in the example shown via an abstract storage access interface 116. In various embodiments, hosts such as hosts 1 to N of FIG. 1 may be deployed on a number of racks M, for example with N/M hosts on each rack.

In the example shown in FIG. 1, the distribute storage system portion of the large-scale system of FIG. 1 includes storage nodes on each of the hosts 1 to N, represented in FIG. 1 by storage nodes 118, 120, and 122 on hosts 110, 112, and 114, respectively. The storage nodes operate under the control of a storage master 124, which is responsible for accepting data access requests and maintains storage system metadata indicating, for example, the locations at which each data block is stored. In the example shown in FIG. 1, blocks are represented by the smaller squares shown in storage nodes 118, 120, and 122. Blocks having the same cross-hatch pattern in this example may be replicas of one another. In the example shown in FIG. 1, the primary master 102 is configured query the storage master 124, e.g., periodically, to keep the storage metadata cache 107 up to date.

When the master node 102 accepts a query, it is parsed and planned according to the statistics of the tables in the query, e.g., based on database system metadata 106 and storage metadata cache 107. After the planning phase, a query plan is generated. A query plan is sliced into many slices. In query execution phase, a "gang" or other grouping of segments is allocated for each slice to execute the slices. In some embodiments, the size of the gangs is dynamically determined by using knowledge of the data distribution (data block locations) and available resources (locations of segments having bandwidth available). In some embodiments, within the planning phase, a data locality based query optimization is performed for scan operators. In the example shown in FIG. 1, segments are running on the same hosts as the distributed file system's storage nodes. Data block location metadata associated with files associated with tables to be scanned, e.g., stored in storage metadata cache 107, is used to calculate a mapping between table data blocks and segments. An effort is made to cause each table data block to be scanned by a segment running on the host that actually stores the data. This data-block-to-segment mapping is dispatched in some embodiments to each segment where scan operators are executed. In some embodiments, the mapping is included in the query plan, and the entire query plan is sent to each segment, including an indication as to which segment is to perform which portion of the query plan.

Figure 2:
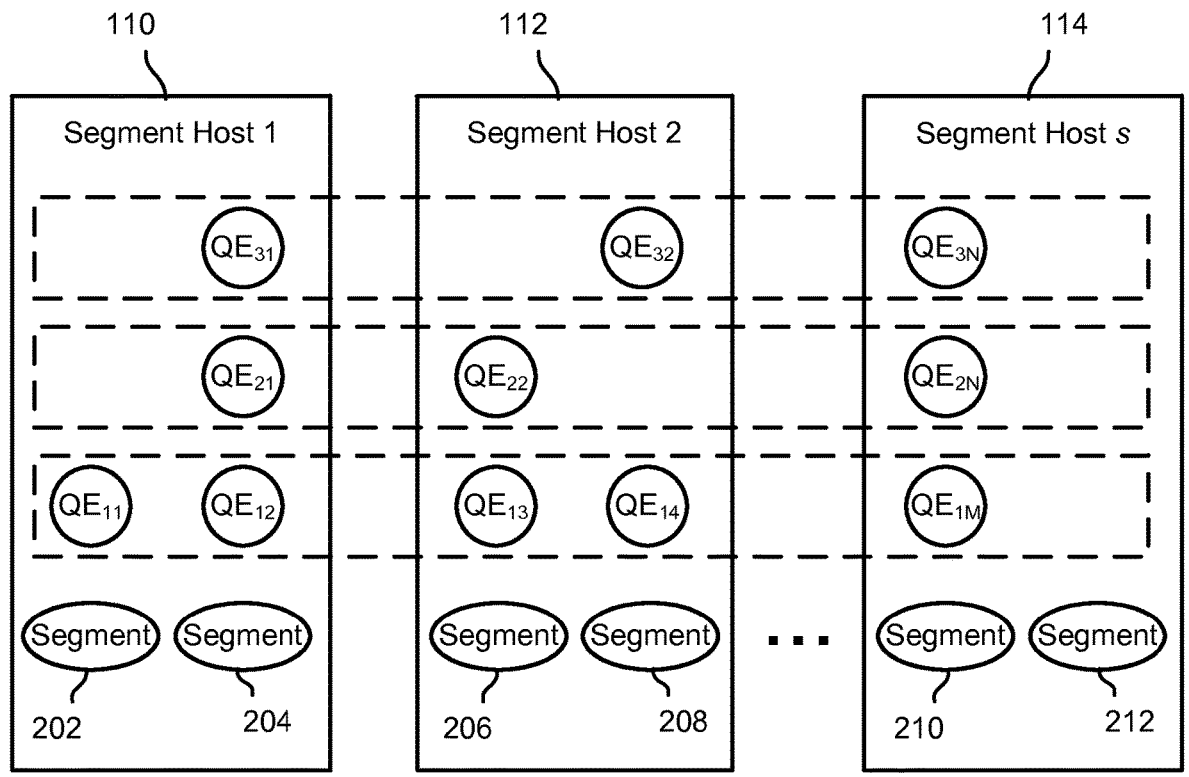
FIG. 2 is a block diagram illustrating an embodiment of a plurality of segment host systems.

FIG. 2 is a block diagram illustrating an embodiment of a plurality of segment host systems. In the example shown, each of segment hosts 110, 112, and 114 is shown as having two segments deployed thereon, specifically segments 202 and 204, 206 and 208, and 210 and 212, respectively. In FIG. 2, the storage node (e.g., storage nodes 118, 120, and 122 of FIG. 1) which may be present on the same host in various embodiments is not shown. Each segment can run multiple "query execution" threads, indicated in FIG. 2 but the capital letters QE with numerical subscripts. In the example shown, each of the rectangles formed by dotted lines represents a "slice" or other portion of a query plan, each of which in the example shown as been assigned to be performed by a corresponding subset of the segments 202, etc. Specifically, the lower rectangle includes in this example tasks that have been dispatched to be performed by segments 202, 204, 206, 208, and 210, each of which is shown to be using a query execution process (QE) to perform the associated work. The middle rectangle in this example has been assigned to a "gang" that includes QE's associated with segments 204, 206, and 210, while the upper rectangle indicates a slice of the query plan that has been assigned to segments 204, 208, and 210.

In various embodiments, two kinds of strategies may be used for dispatching, i.e., assigning tasks comprising a slice of a query plan. The first is to use a fixed number of QEs to execute each slice, for example a number of QE's that is equal to or less than the number of segments in the cluster. The scheduling algorithm to match QEs to segments in various embodiments considers the dynamically available resources and the data locality for scan nodes.

Given the total number of QEs slots available for the query, the second strategy allows variable size gangs. In typical analytical queries, high-level slices often do less work than low-level slices due to the bottom-up processing nature of a query plan. By assigning more QEs to perform low-level slices than less processing intensive upper-level slices, resources can be more fully utilized.

Figure 3A:
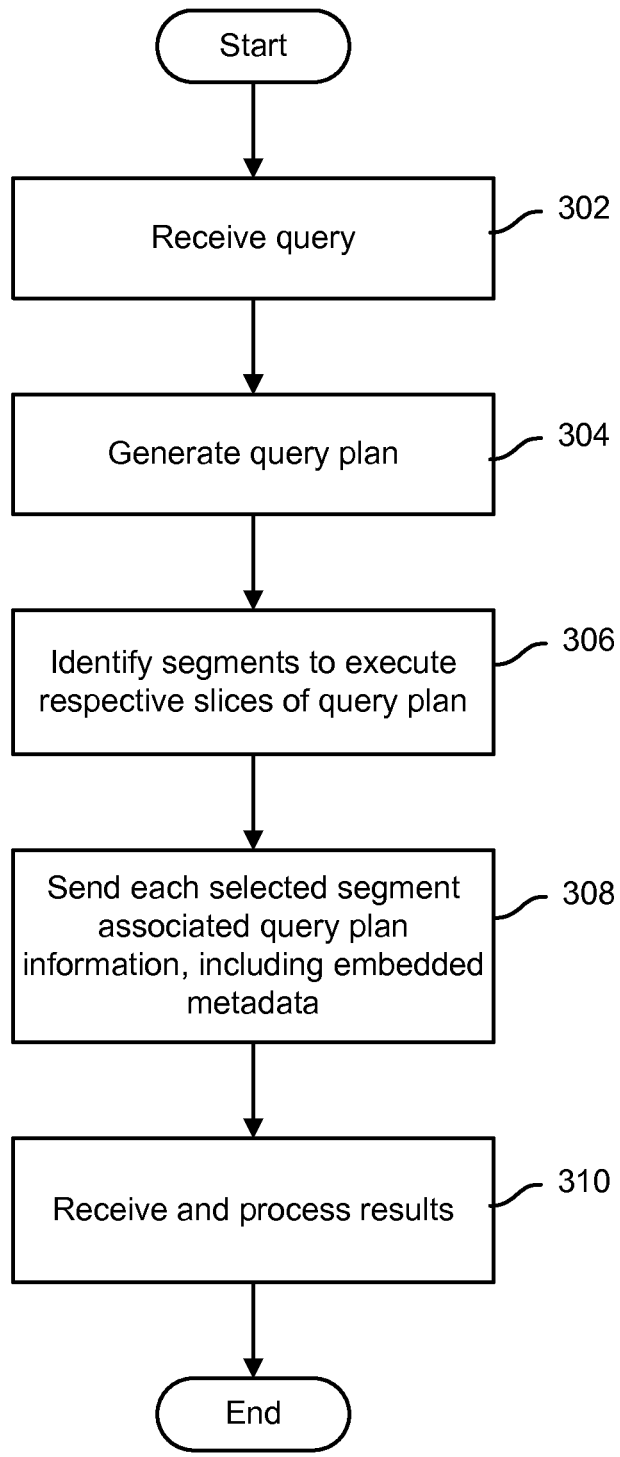
FIG. 3A is a flow chart illustrating an embodiment of a database query processing process.

FIG. 3A is a flow chart illustrating an embodiment of a database query processing process. In some embodiments, a master node, such as primary master 102 of FIG. 1, implements the process of FIG. 3. In the example shown, a query is received (302). A query plan is generated (304). The plan is divided into a plurality of slices, and for each slice a corresponding set of segments ("gang") is identified to participate in execution of that slice of the query plan (306). For each slice of the query plan, the segments selected to perform processing required by that slice are sent a communication that includes both the applicable portion of the plan to be performed by that segment and metadata that may be required by a receiving segment to perform tasks assigned to that segment (308). In some embodiments, the metadata included in the query plan slice and/or other communication sent to the respective segments selected to participate in execution of that slice of the plan includes metadata from a central metadata store, e.g., metadata 106 of FIG. 1, and includes information indicating to the segment the location of data with respect to which that segment is to perform query plan slice related processing. Query results are received from the respective segments to which query tasks were dispatched, and processed to generate, e.g., at the master node, a master or overall response to the query (310).

Figure 3B:
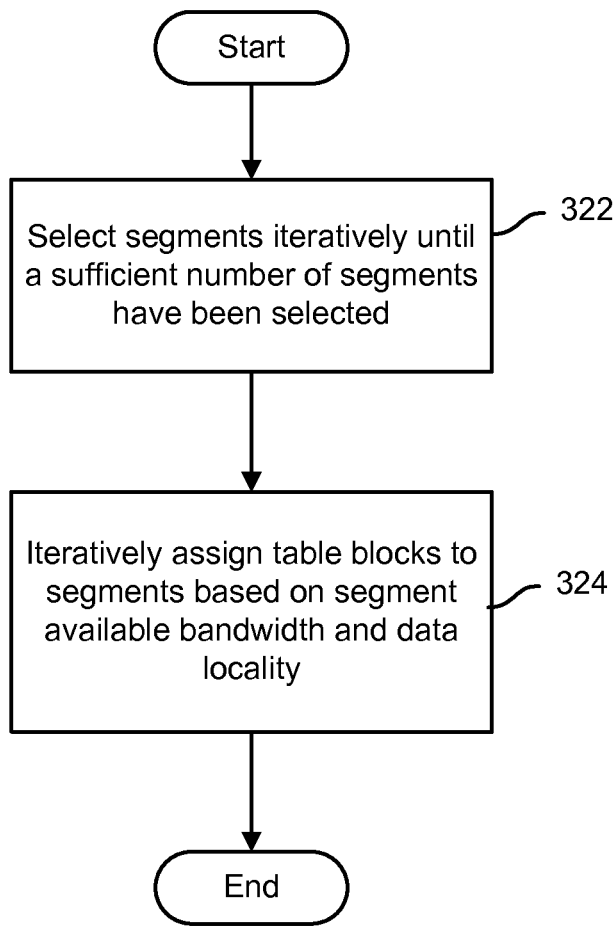
FIG. 3B is a flow chart illustrating an embodiment of a process to identify segments to perform portions of a query plan.

FIG. 3B is a flow chart illustrating an embodiment of a process to identify segments to perform portions of a query plan. In the example shown, segments are selected iteratively until a number of segments sufficient to perform the query plan have been selected (322). In various embodiments, each host has multiple segments, and all segments form a resource pool, which is shared by all users. Based on the sizes of the tables to be scanned in the query, the appropriate number of segments to be used to perform scan operations is determined. In some embodiments, the user can configure the number of segments. Once the required number of segments has been determined, in some embodiments segment selection is performed as follows: (a) select one segment from the host that has the highest number of idle segments, and mark the segment as occupied; (b) check whether enough segments have been selected, if yes then exit, if not repeat (a). In various embodiments, segment selection is performed in a manner that distributes the workload across the hosts as evenly as possible. Table blocks are assigned iteratively to segments based on segment available bandwidth and data location (324).

Figure 3C:
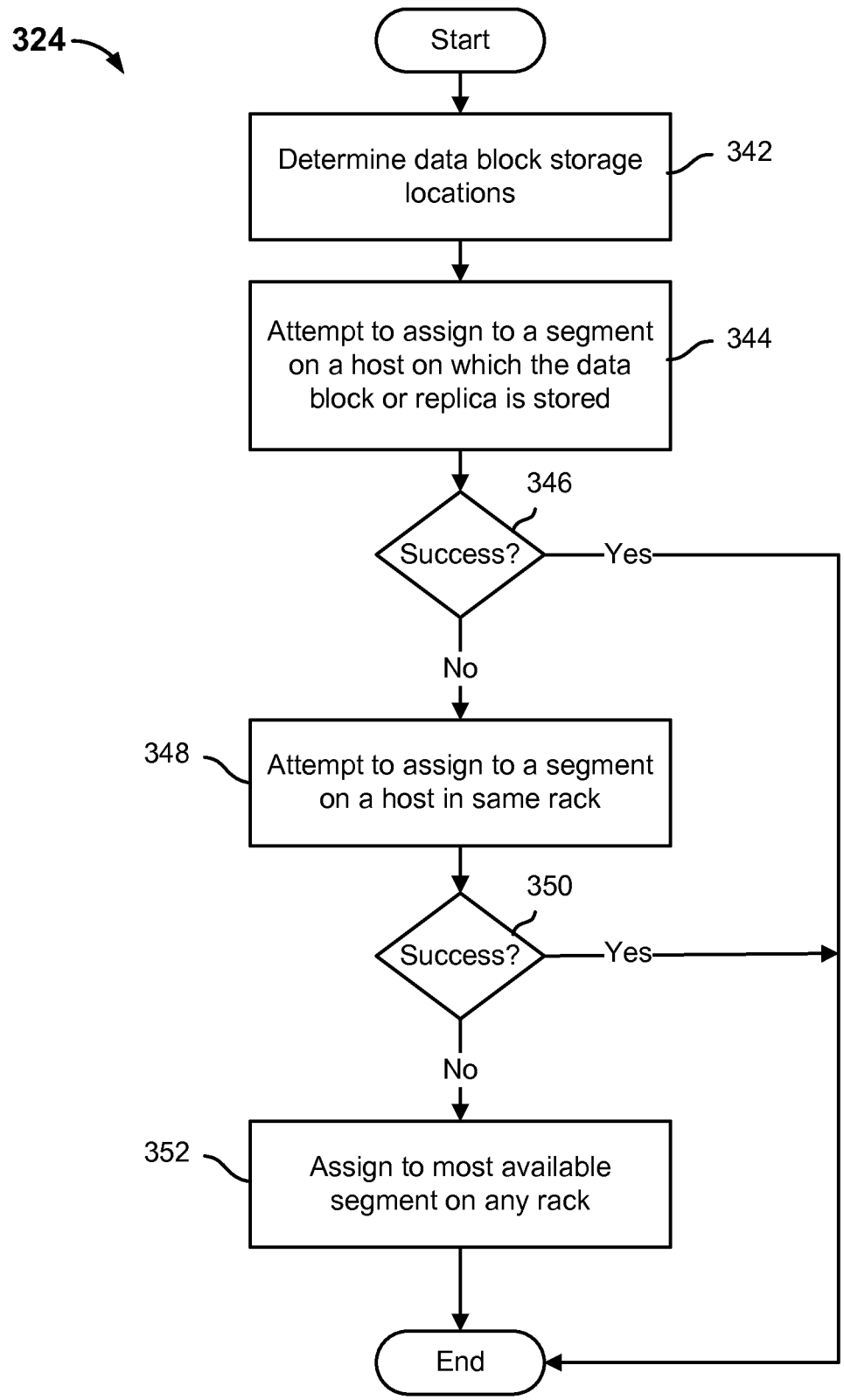
FIG. 3C is a flow chart illustrating an embodiment of a process to assign blocks to segments based on locality.

FIG. 3C is a flow chart illustrating an embodiment of a process to assign blocks to segments based on locality. In the example shown, the locations at which a data block to be scanned is stored are determined (342), e.g., by reading storage system metadata from a cache such as cache 107 of FIG. 1. If a segment on a host on which a copy of the block is stored is available (i.e., has been selected into the pool for that query and has sufficient bandwidth), then a segment on that host is selected (344, 346). If multiple such segments are available, the one with the most available bandwidth is selected. In various embodiments, available bandwidth is determined by comparing a calculated maximum data size (volume) to a currently-assigned workload. For example, in some embodiments, the maximum data size (volume) to be assigned to any given segment is determined according to the following formula:

$$V\max = \frac{\text{Total size of tables to be scanned}}{\text{Number of segments}} * (1 + \text{extra})$$

Where "extra" is a configurable parameter between 0 and 1. In various embodiments, the "extra" parameter can make it possible for segments having good data locality to be assigned more data to scan.

In some embodiments, the available bandwidth of a segment is determined by comparing the volume of data currently assigned to be scanned by the segment to the maximum computed as indicated above, i.e.:

Available bandwidth=$V$max−$V$assigned

If the size of a data block to be processed is less than or equal to the available bandwidth, the segment is considered to have sufficient bandwidth available to scan the block.

Referring further to FIG. 3C, if there is no segment having sufficient bandwidth available on a host on which the data block is stored (346), an attempt is made to assign the block to a segment on a host on a same rack as a host on which the data block is stored (348). If only one such segment exists, the block is assigned to that segment; if there are multiple such segments, the one with the most available bandwidth is selected. If there is no segment having sufficient available bandwidth either on a host on which the data block is store or on a host on a same rack as a host on which the data block is stored (350), then the segment with the most available bandwidth is assigned (352). The process of FIG. 3C is repeated for successive data blocks until all have been assigned to a segment.

Figure 4:
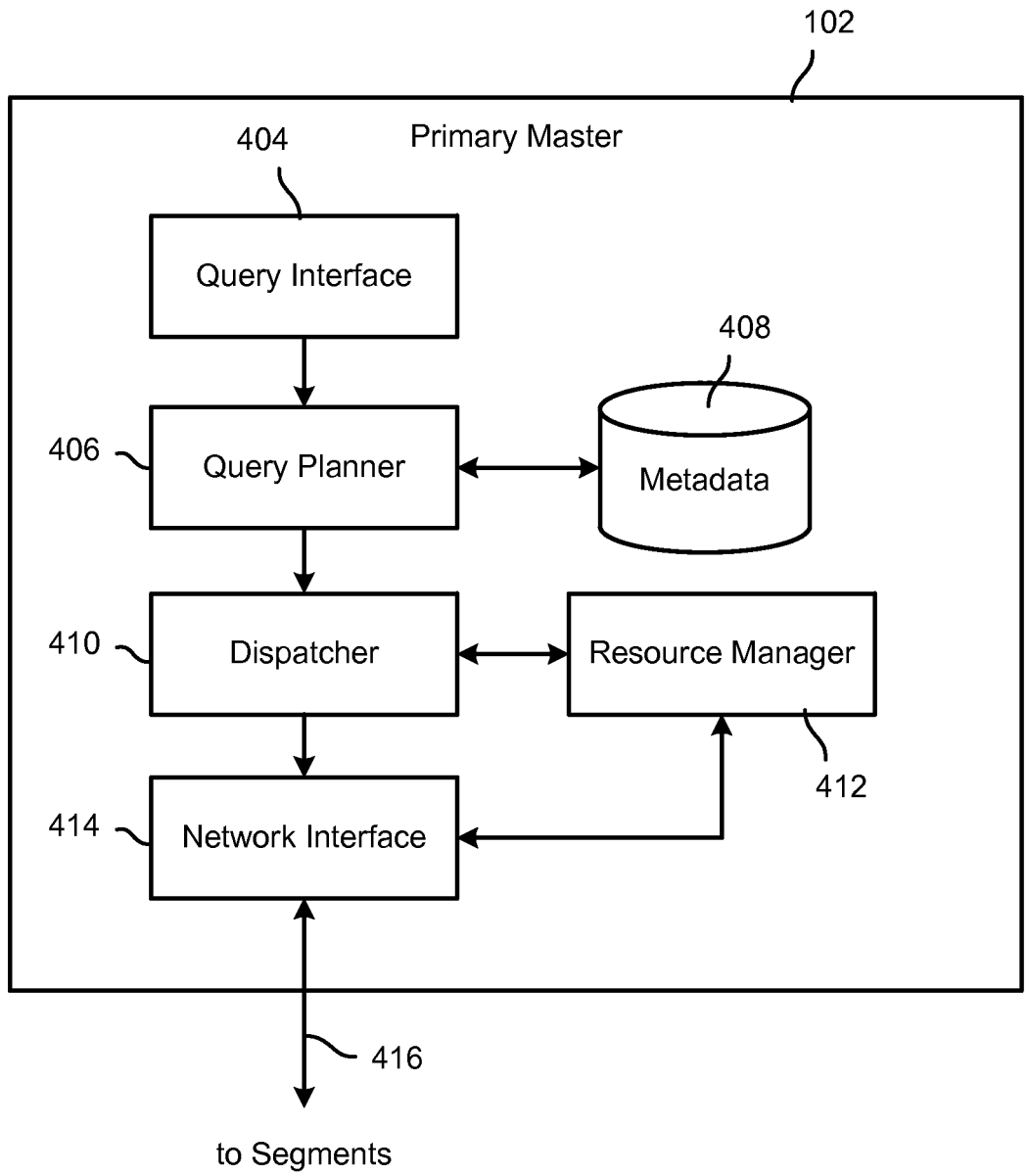
FIG. 4 is a block diagram illustrating an embodiment of a primary master system.

FIG. 4 is a block diagram illustrating an embodiment of a primary master system. In the example shown, the primary master 102 comprises one or more processors, memory, and/or non-volatile storage device, such a disk drive (not shown). The processor(s) is/are configured in the example shown to provide a query interface 404, for example a user interface code configured to receive a query, such as one entered via an input device such as a keyboard, either locally or remotely and sent to the primary master 102, e.g., via a network. The query interface 404 provides query data to a query planner 406 configured to use metadata 408 to create a query plan. In some embodiments, metadata 408 includes database system metadata, such as stored in database system metadata store 106 of FIG. 1 and cached storage system metadata, such as stored in storage system metadata cache 107 of FIG. 1. The query plan is divided into independently executable subparts (e.g., slices). A dispatcher 410 uses information about segment availability, load, etc., from a resource manager 412 to select for each slice of the query plan a corresponding subset of segment to perform processing required by that slice. The dispatcher 410 forms and sends to each of the selected segments, via a network interface 414 (e.g., a network interface card or NIC) and a network connection 416, a communication that includes data indicating the processing to be performed by that segment and metadata to be used to perform assigned processing.

Figure 5:
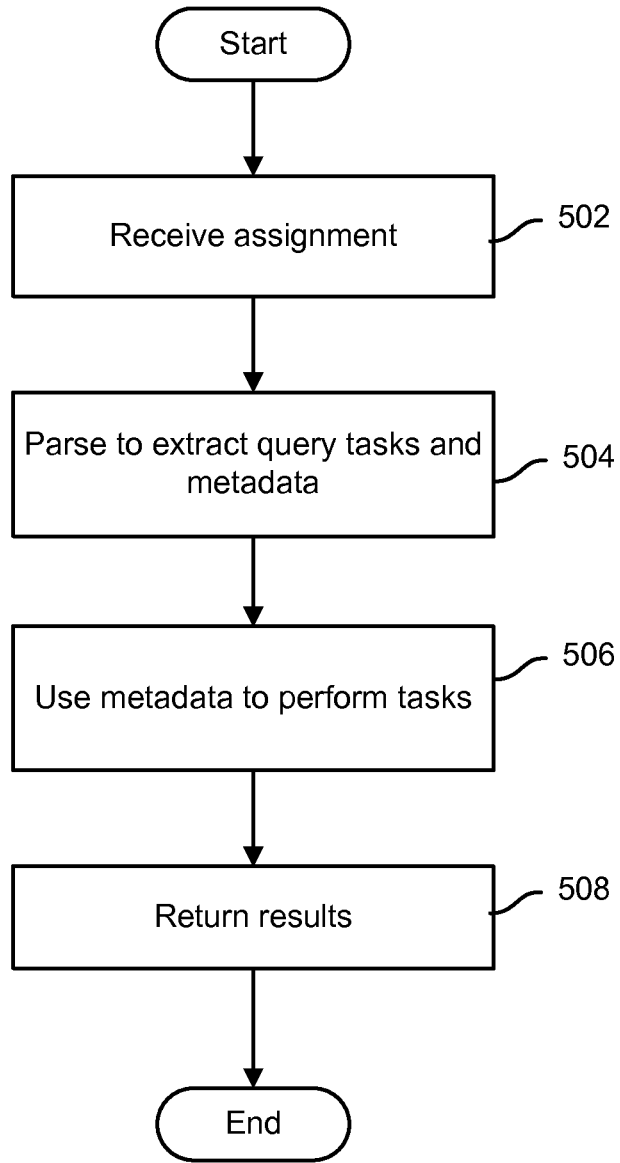
FIG. 5 is a flow chart illustrating an embodiment of a query task execution process.

FIG. 5 is a flow chart illustrating an embodiment of a query task execution process. In various embodiments, the process of FIG. 5 may be implemented on each of a plurality of segments comprising a large scale distributed system. In the example shown, an assignment associated with a slice or other portion of a query plan is received (502). The assignment is parsed to extract query tasks to be performed by the receiving segment and embedded metadata to be used to perform the assigned query tasks (504). The extracted metadata is used to perform the assigned tasks (506). Results determined by the segment are returned, e.g., to a master node from which the assignment was received (508).

Using techniques disclosed herein, scan operations may be performed very efficiently in a large-scale distributed database stored in a distributed storage system, since most scan operators read data from local disks rather than pulling data from remote hosts, resulting in greatly decreased network traffic and accelerated scan operations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
receiving a query;
in response to receiving the query, generating a query plan for the query, wherein the query plan is generated based at least in part on a mapping between data blocks to be used in connection with processing the query and segments;
identifying a set of query processing segments to be used to process the query, comprising:
determining for each of a plurality of data blocks to be scanned to process the query a corresponding storage location in which the data block is stored in a distributed storage system; and
assigning, for each of the plurality of data blocks to be scanned, a query processing segment that is selected based at least in part on an available bandwidth of the query processing segment and a location of the query processing segment relative to the corresponding storage location in which the data block is stored, comprising:
determining if one or more segments on a host at which the data block is stored is available to process at least part of a query,
in response to a determination that more than one segment on a host at which the data block is stored is available to process the at least the part of the query, assigning the at least the part of the query to corresponding segment of the more than one segment that has a highest available bandwidth,
determining for a next data block to be assigned whether any segment on a same host on which the data block is stored has an amount of available bandwidth that is greater than or equal to a size of the next data block, and
assigning, for the next data block, a corresponding query processing segment based at least in part on a determination of whether any segment on a same host on which the next data block is stored has the amount of available bandwidth that is greater than or equal to the size of the next data block; and
communicating, to at least one processing segment from the set of query processing segments, a corresponding portion of the query plan and metadata including information indicating a location of data with respect to which processing is to be performed in connection with the query.

2. The method of claim 1, wherein identifying a set of query processing segments to be used to process the query includes selecting for inclusion in the set of query processing segments one or more selected query processing segments determined to have at least a prescribed amount of available bandwidth.

3. The method of claim 1, wherein determining for each of a plurality of data blocks to be scanned to process the query a corresponding storage location in which the data block is stored in a distributed storage system includes accessing storage system metadata.

4. The method of claim 3, wherein the storage system metadata is accessed from a storage system metadata cache at a database master node.

5. The method of claim 1, wherein the available bandwidth is determined based at least in part on a calculated maximum data size and a currently assigned data size.

6. The method of claim 5, wherein the maximum data size is determined by dividing the total size of database tables to be scanned by a number of query processing segments included in the set of query processing segments and multiplying the result by a prescribed factor.

7. The method of claim 6, wherein the prescribed factor is greater than 1.

8. The method of claim 1, further comprising: determining, in response to a determination that no segment with sufficient available bandwidth exists on a same host on which the data block is stored, whether any segment on a host on a same rack as a host on which the data block is stored has an amount of available bandwidth that is greater than or equal to a size of the data block.

9. The method of claim 8, further comprising assigning the data block to a segment having a highest amount of available bandwidth, in response to a determination that no segment with sufficient available bandwidth exists either on a same host on which the data block is stored or on a host on a same rack as a host on which the data block is stored.

10. The method of claim 1, wherein a query processing segment of the set of query processing segments identified to be used to process a query corresponds to a compute unit of a database engine.

11. The method of claim 10, wherein the query processing segment is comprised in a segment host that comprises one or more query processing segments and one or more storage nodes that respectively store one or more data blocks.

12. The method of claim 1, wherein in response to a determination that no query processing segment exists on a host on which one of the plurality of data blocks is stored has sufficient bandwidth to process the query, the query processing segment is selected such that a preference is given to query processing segments on a host on a same rack as the host on which the one of the plurality of data blocks is stored.

13. The method of claim 1, further comprising:
computing a maximum data size to be assigned to the query processing segment.

14. The method of claim 13, further comprising:
computing a measure of available bandwidth for the processing segment based at least in part on the computed maximum data size to be assigned to the query processing segment.

15. The method of claim 1, wherein the communicating the corresponding portion of the query plan and metadata comprises communicating an entire query plan to each processing segment of the set of query processing segments, and communicating an indication as to which processing segment is to perform which portion of the query plan.

16. The method of claim 1, wherein a number of query processing segments assigned to process each slice of the query is the same.

17. The method of claim 1, wherein a number of query processing segments assigned to process each slice of the query is dynamically determined based at least in part on available resources and data locality corresponding to the slice.

18. A system, comprising:
a processor configured to:
receive a query;
in response to receiving the query, generate a query plan for the query, wherein the query plan includes a mapping between data blocks and segments to be used in connection with processing the query;
identify a set of query processing segments to be used to process the query, comprising:
determine for each of a plurality of data blocks to be scanned to process the query a corresponding storage location in which the data block is stored in a distributed storage system; and
assign, for each of the plurality of data blocks to be scanned, a query processing segment that is selected based at least in part on an available bandwidth of the query processing segment and a location of the query processing segment relative to the corresponding storage location in which the data block is stored, comprising:
determine if one or more segments on a host at which the data block is stored is available to process at least part of a query,
in response to a determination that more than one segment on a host at which the data block is stored is available to process the at least the part of the query, assign the at least the part of the query to corresponding segment of the more than one segment that has a highest available bandwidth,
determine for a next data block to be assigned whether any segment on a same host on which the data block is stored has an amount of available bandwidth that is greater than or equal to a size of the next data block, and
assign, for the next data block, a corresponding query processing segment based at least in part on a determination of whether any segment on a same host on which the next data block is stored has the amount of available bandwidth that is greater than or equal to the size of the next data block; and
communicate, to at least one processing segment from the set of query processing segments, a corresponding portion of the query plan and metadata including information indicating a location of data with respect to which processing is to be performed in connection with the query; and
a memory or other storage device coupled to the processor and configured to store data indicating said corresponding storage location in which the data block is stored in the distributed storage system.

19. The system of claim 18, wherein identifying a set of query processing segments to be used to process the query includes selecting for inclusion in the set of query processing segments one or more selected query processing segments determined to have at least a prescribed amount of available bandwidth.

20. The system of claim 18, wherein determining for each of a plurality of data blocks to be scanned to process the query a corresponding storage location in which the data block is stored in a distributed storage system includes accessing storage system metadata stored in said memory or other storage device.

21. The system of claim 18, wherein the processor is further configured to determine, in response to a determination that no segment with sufficient available bandwidth exists on a same host on which the data block is stored, whether any segment on a host on a same rack as a host on which the data block is stored has an amount of available bandwidth that is greater than or equal to a size of the data block.

22. The system of claim 21, wherein the processor is further configured to assign the data block to a segment having a highest amount of available bandwidth, in response to a determination that no segment with sufficient available bandwidth exists either on a same host on which the data block is stored or on a host on a same rack as a host on which the data block is stored.

23. A computer program product embodied in a tangible, non-transitory computer-readable storage medium, comprising computer instructions for:
   receiving a query;
   in response to receiving the query, generating a query plan for the query, wherein the query plan includes a mapping between data blocks and segments to be used in connection with processing the query;
   identifying a set of query processing segments to be used to process the query, comprising:
      determining for each of a plurality of data blocks to be scanned to process the query a corresponding storage location in which the data block is stored in a distributed storage system; and
      assigning, for each of the plurality of data blocks to be scanned, a query processing segment that is selected based at least in part on an available bandwidth of the query processing segment and a location of the query processing segment relative to the corresponding storage location in which the data block is stored, comprising:
         determining if one or more segments on a host at which the data block is stored is available to process at least part of a query,
         in response to a determination that more than one segment on a host at which the data block is stored is available to process the at least the part of the query, assigning the at least the part of the query to corresponding segment of the more than one segment that has a highest available bandwidth,
         determining for a next data block to be assigned whether any segment on a same host on which the data block is stored has an amount of available bandwidth that is greater than or equal to a size of the next data block, and
         assigning, for the next data block, a corresponding query processing segment based at least in part on a determination of whether any segment on a same host on which the next data block is stored has the amount of available bandwidth that is greater than or equal to the size of the next data block; and
   communicating, to at least one processing segment from the set of query processing segments, a corresponding portion of the query plan and metadata including information indicating a location of data with respect to which processing is to be performed in connection with the query.

24. The computer program product of claim 23, wherein assigning, for each of the plurality of data blocks to be scanned, the query processing segment selected based at least in part on the available bandwidth of the query processing segment and the location of the query processing segment relative to the corresponding storage location in which the data block is stored includes determining for a next data block to be assigned whether any segment on a same host on which the data block is stored has an amount of available bandwidth that is greater than or equal to a size of the data block.

* * * * *